United States Patent [19]
Allison

[11] 3,797,354
[45] Mar. 19, 1974

[54] APPARATUS FOR DAMPING VIBRATIONS OF A ROTARY CUTTING BLADE

[75] Inventor: Rudolph L. Allison, Rockford, Ill.

[73] Assignee: Paramount Textile Machinery Co., Chicago, Ill.

[22] Filed: Apr. 24, 1972

[21] Appl. No.: 246,654

[52] U.S. Cl............ 83/824, 30/389, 83/676
[51] Int. Cl............................... B26d 1/14
[58] Field of Search ............ 83/824, 826, 825, 829, 83/821, 835, 591, 491, 469, 676, 663; 30/389, 388, 390, 391

[56] References Cited
UNITED STATES PATENTS
| | | | |
|---|---|---|---|
| 3,438,410 | 4/1969 | Sautilli | 30/389 |
| 2,490,255 | 12/1949 | Chase | 30/389 X |
| 651,652 | 6/1900 | Davis | 83/824 |
| 3,221,783 | 12/1965 | Kaltenmark et al. | 83/826 X |

FOREIGN PATENTS OR APPLICATIONS
| | | | |
|---|---|---|---|
| 231,147 | 1/1964 | Germany | 30/389 |
| 1,358,457 | 3/1964 | France | 30/389 |

Primary Examiner—Frank T. Yost
Attorney, Agent, or Firm—Burns, Doane, Swecker & Mathis

[57] ABSTRACT

A method and apparatus for damping vibrations of a rotary cutting blade. In one disclosed embodiment, the planar surface of a rotary cutting blade is frictionally contacted by a damping means comprising a plurality of coaxial, independently rotatable disks each presenting a relatively narrow peripheral surface in contact with the planar surface and disposed with the axis of rotation parallel to the planar surface and intersecting the axis of rotation of the cutting blade. In another disclosed embodiment, the damping means comprises an elongated, roller means having a generally frustoconical peripheral surface in frictional contact with the planar surface of the cutting blade. The frustoconical surface may be defined by a continuous surface or by a plurality of spaced coaxial, frustoconical roller segments. The roller means is rotatably mounted with its axis of rotation intersecting the planar surface at the axis of rotation of the cutting blade. Means for adjusting the frictional contact between the damping means and the planar surface are also disclosed.

7 Claims, 5 Drawing Figures

PATENTED MAR 19 1974 3,797,354

APPARATUS FOR DAMPING VIBRATIONS OF A ROTARY CUTTING BLADE

BACKGROUND OF THE INVENTION

This invention relates to a vibration damping apparatus for rotary cutting blades and more particularly to a roller pressure device frictionally engageable with the planar face of a rotary saw blade.

Rotary cutting blades, particularly the type of saw blades utilized for cutting metallic bar stock may chatter and vibrate excessively during a cutting operation. It can be appreciated that such vibrations have a damaging effect on the quality of the cut and the life of the cutting blade. Moreover, since large saw blades having carbide cutting teech are frequently employed to cut steel bar stock of large cross section, blade vibration may have an intolerable effect on the life of the carbide teeth.

Approaches to solving saw blade vibration problem have involved the mounting of the cutting teeth in special shock and vibration absorbing materials. Another approach has been to utilize vibration absorbing mounts and bearing assemblies on the cutting machine itself to dampen the machine vibration in an attempt to at least minimize the vibration problem. These solutions, however, have not been entirely satisfactory due to the relatively high costs involved in producing the above-described special cutting blades and mounting assemblies for cutting machines.

A simple, yet effective method for damping vibrations of rotating cutting tools and/or workpieces involves urging a contact roller against a surface of the tool or workpiece to thereby dampen vibrations.

For example, U.S. Pat. No. 3,207,014 to Carlstedt discloses a circular, rotatable disk which may be pressed against a rotating cutting tool or workpiece in an attempt to dampen vibrations. As the tool or workpiece rotates, the disk is rotated through frictional contact at approximately the same linear velocity as the portion of the tool or workpiece driving the disk. The disk thus provides a relatively simple damping member which aids in minimizing vibrations. However, the disk operates on a very small portion of the surface of the tool or workpiece and may prove ineffective when extreme vibration is encountered.

To increase the portion of the surface of the rotary cutting tool or workpiece contacted by the rotatable damping member, cylindrical rollers having a greater axial length than the disk mentioned above may be employed. The increased damping surface provided by the increased length of the roller in contact with the tool or workpiece surface produces improved damping.

However, the use of damping members such as rollers to provide increased contact with the surface of a rotary cutting blade has also produced undesirable effects. The angular velocity of the saw blade for a fixed driving speed is the same for all points on the saw blade surface. However, the tangential linear velocity at any point on the saw blade varies directly with the radial distance of the point from the axis of the blade rotation. Since the roller contacts the planar surface of the cutting blade along a radial line on the cutting blade surface, the cutting blade tends to frictionally drive the roller at different linear velocities along its length.

Of course, the roller can only rotate as a unit with one tangential linear velocity along its length so there must be differences between the tangential linear velocity of the cutting blade surface and the tangential linear velocity of the roller surface at points of contact along the length of the roller surface. These differences in linear velocity are manifested as slippage between the cutting blade surface and the roller surface resulting in undesirable wear and heating of both of these contacting surfaces.

Accordingly, it is an object of the present invention to provide a novel method and apparatus for damping vibration of a rotary cutting blade which obviates problems encountered in prior damping systems of the sort noted above.

It is another object of the present invention to provide a novel method and apparatus for damping variations of a rotary cutting blade in which the planar surface of the cutting blade is contacted by a damping means having an effective length in contact with the blade sufficient to dampen extreme vibration of the blade without undesirable differences in linear velocity between the cutting blade surface and the damping means surface along the length of the damping means surface.

It is a more specific object of the present invention to provide a frictionally driven contact roller for damping cutting blade vibrations wherein the roller surface is shaped and positioned such that all points along the surface of the roller are frictionally driven at substantially the same linear velocities as the portions of the planar cutting blade surface contacted by the roller at these points.

It is a further object of the present invention to provide a novel method and apparatus for damping vibration of a rotary cutting blade wherein the damping pressure applied to the blade is variable.

One form of the present invention intended to accomplish at least some of the foregoing objects comprises roller means rotatably supported with an elongated peripheral surface defined by the roller means in frictional contact with the planar surface of a cutting blade. The peripheral surface defined by the roller means contacts the planar surface in such a manner that there is substantially no slippage between the contacting peripheral surface and the planar surface along the contact points due to differences in linear velocity between these surfaces.

In one specific form, the invention comprises a roller means defined by a plurality of axially spaced, independently rotatable disks, each presenting a narrow peripheral surface in contact with the planar surface of the cutting blade. The axial length of the roller means defined by the disks is substantially greater than the axial length of each narrow peripheral surface presented by each disk so that an overall axial length sufficient to dampen extreme vibrations contacts the planar face of the cutting blade while substantial differences in linear velocity between the planar surface and the roller means surface do not exist along connected points of contact.

In another specific form, the roller means is defined by a generally frustoconical peripheral surface and is rotatably supported in frictional contact with the planar surface of the cutting blade. The axis of rotation of the roller means is oriented in a direction so as to substantially intersect the axis of rotation of the cutting blade at the planar surface of the cutting blade. With the roller means supported in this manner, the linear velocities of all points of contact on both the cutting blade planar surface and the roller means peripheral surface are substantially equal.

The peripheral surface of the roller means may be defined by the outer surface of a single, elongated, frustoconical roller or by the outer surfaces of a plurality of spaced, coaxial, frustoconical discs which together form the outer surface of the roller means.

The roller means may be fixedly mounted adjacent the planar surface of the cutting blade for operative contact therewith as described above or may be adjustably mounted adjacent the planar surface of the cutting blade so that the force applied to the blade by the roller means may be varied.

THE DRAWINGS

These and other objects and advantages of the present invention will become apparent to one skilled in the art to which the invention pertains from a perusal of the detailed description when read in conjunction with the appended drawings in which.

Figure 3:
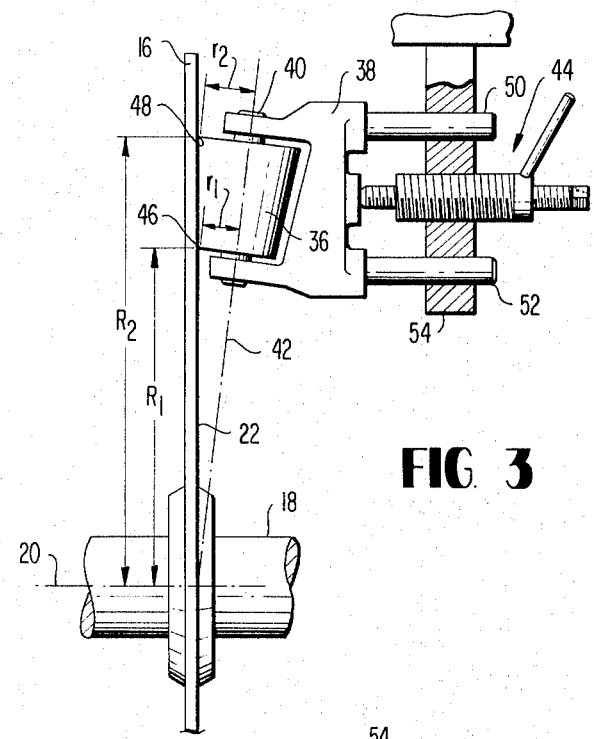
FIG. 3 is a view in elevation of another embodiment of the rotary cutting blade damping means of the present invention.
Figure 5:
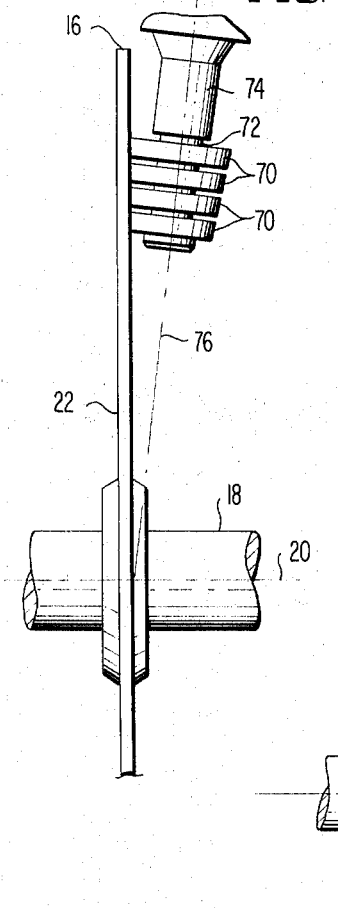
Figure 4:
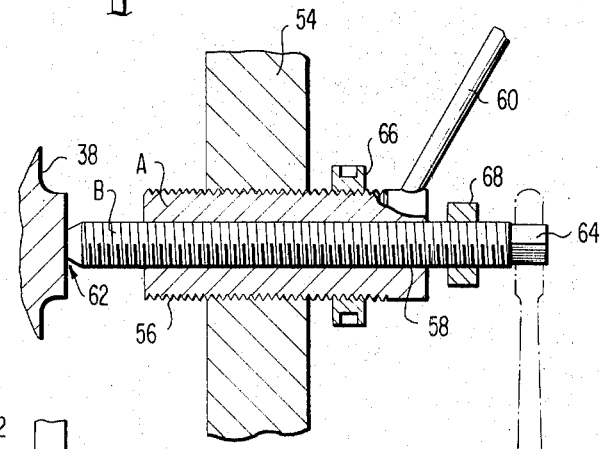
Figure 2:
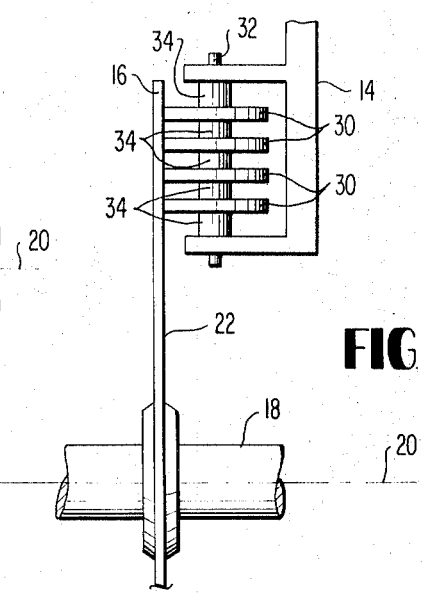
FIG. 2 is a view in elevation of one embodiment of the rotary cutting blade damping means shown mounted in contact with a rotary cutting blade.

FIG. 4 is a view in cross section of one form of a pressure adjustment means which may be utilized in connection with the damping means of FIGS. 2 and 3; and FIG. 5 is a view in elevation of another embodiment of the rotary cutting blade vibration damping means of the present invention schematically illustrating another form of adjustment means for adjusting the pressure applied to the cutting blade by the damping means.

DETAILED DESCRIPTION

Figure 1:
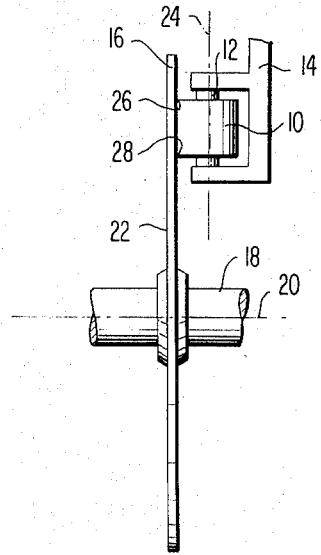
FIG. 1 is a view in elevation of a prior art rotary cutting blade vibration damping means shown mounted in contact with a rotary cutting blade.

FIG. 1 is illustrative of one prior art vibration damping technique wherein a cylindrical roller 10 is rotatably mounted on a shaft 12 supported by a support frame 14. A rotary cutting blade 16 having a plurality of cutting teeth (not shown) on the periphery thereof is mounted on a rotatable shaft 18 for rotation about an axis 20 of the shaft. The axis 20 is generally perpendicular to the substantially planar surfaces generally indicated at 22 of the cutting blade 16. The axis of rotation 24 of the roller 10 is generally parallel to the planar surface 22 of the cutting blade 16 and intersects the axis of rotation 20 of the cutting blade perpendicular thereto.

Since, as was previously discussed, a considerable contact region between the peripheral surface of the roller 10 and the planar surface of the cutting blade 16 may be required to dampen extreme vibrations, a considerable spacing may exist between the ends of the roller 10. Thus, one end of the roller 10 is considerably closer to the axis 20 than the other end of the roller 10. As can be appreciated, when the cutting blade 16 is rotated at an angular velocity $w$ the linear tangential velocity $v$ of points along the planar surface of the cutting blade 16 increases from zero at the axis 20 to some maximum value at the periphery of the cutting blade 16. This linear tangential velocity at any point along the planar surface 22 may be expressed, in terms of the distance $r$ between the point in question and the axis 20, as follows:

$$v = rw \quad (1)$$

It can thus be seen that the linear velocity of the cutting blade 16 at a point of contact 26 between the planar surface 22 and the end of the roller 10 spaced radially outermost from the axis 20 will exceed the linear velocity of the cutting blade 16 at a point of contact 28 between the planar surface 22 and the radially innermost end of the roller 10.

On the other hand, since the roller 10 is generally cylindrical and is a solid member, the linear tangential velocities of all points along the peripheral surface thereof, i.e., the curved surface thereof, are the same when the roller 10 is rotated. Thus, assuming that the linear velocity of the roller surface is equal to the linear velocity of the cutting blade 16 at the point 28 on the planar surface 22, the roller 10 necessarily slips relative to the planar surface 22 of the cutting blade at all other points of contact therebetween since the linear velocity of the cutting blade 16 is greater than that of the roller 10 surface at all other points of contact. It can be appreciated that excessive wear and excessive heating will likely occur by reason of the slipping between the frictionally engaged roller 10 and cutting blade 16.

Referring now to FIG. 2 wherein like numerical designations have been utilized to identify elements previously described in connection with FIG. 1, there is shown one embodiment of the vibration damping apparatus of the present invention. As is illustrated in FIG. 2, one form of the present invention may comprise a plurality of relatively narrow, circular disks 30 each independently journaled for rotation on a shaft 32 supported by the support frame 14 and extending generally orthogonal to the axis 20 of blade rotation. The narrow disks 30 may be spaced from the frame 14 and from each other by suitable conventional spacing means such as the illustrated bushings 34.

For any one disk, it can be seen from equation (1) that the difference in linear velocity $\Delta v$ along the planar surface 22 between two radially spaced points is given by the following equation:

$$\Delta v = (r_2 - r_1)w \quad (2)$$

where $r_2$ is the distance between the axis 20 of blade rotation and the outermost point of contact of a disk 30 and $r_1$ is the distance from the axis 20 to the innermost point of contact of any one disk. Assuming, for example that the radial difference between the points of contact of a disk, i.e., the quantity $r_2 - r_1$ is a fraction of an inch, a negligible difference in linear velocity will be manifest across the width of any one disk 30 while, because of the number of disks 30, the effective damping area in contact with the cutting blade 16 will be sufficient to dampen extreme vibrations. This effective area of contact is preferably on the order of at least one twenty-fifth of the radius of the blade 22. While the individual disks may be driven at greatly varying velocities, the independent mounting of each disk minimizes slippage problems because of such varying velocities.

Another embodiment of the present invention wherein the linear velocity of the damping means surface at points along its length are substantially equal to the linear velocities of the corresponding contact points on the cutting blade 16 is illustrated in FIG. 3.

With reference to FIG. 3, a generally frustoconical roller means 36 rotatably carried by a support frame 38 with its peripheral surface in contact with the planar surface 22 of the cutting blade 16 is there illustrated. The roller 36 may be journaled for rotation on a shaft 40 about an axis 42 or, alternatively, may be fixedly mounted on the shaft 40 with the shaft 40 journaled for rotation about the axis 42 in the support frame 38. The support frame 38 may be adjustable laterally with respect to the planar surface 22 of the cutting blade 16 through the use of an adjustment means generally indicated at 44. The adjustment means 44 thereby permits adjustment of the pressure applied to the planar surface 22 by the peripheral surface of the roller 36.

As was previously mentioned, the linear velocities of points along the planar surface 22 of the cutting blade 16 increase in direct proportion to their radial distances from the axis 20. Thus, the linear velocity of the cutting blade at a point of contact 46 between the cutting blade planar surface 22 and the roller 36 may be expressed as:

$$v_1 = R_1 w \quad (3)$$

where
$R_1$ is the distance between the axis 20 and the point 46 and
$w$ is the angular velocity of the cutting blade 16.

Likewise, the linear velocity of the cutting blade 16 at a point of contact 48 between the roller surface and the cutting blade planar surface may be expressed as:

$$v_2 = R_2 w \quad (4)$$

where
$R_2$ is the radial distance between the axis 20 at the contact point 48.

Assuming that the radius of the roller 36 at the point of contact 46 is $r_1$ and that the radius of the roller 36 at the point of contact 48 is $r_2$, the linear velocity of the roller surface at each of the points 46 and 48 may be expressed, respectively, as follows:

$$v_{r1} = r_1 w_r \quad (5)$$

$$v_{r2} = r_2 w_r \quad (6)$$

where
$w_r$ is the angular velocity of the roller 36.

Since it is desirable to match the angular velocity of the roller surface to the angular velocity of the cutting blade surface at all points of contact therebetween, the following identities should exist at points 46 and 48 to achieve this result:

$$R_1 w = r_1 w_r \quad (7)$$

$$R_2 w = r_2 w_r \quad (8)$$

In each of the above equations, the angular velocity $w_r$ of the roller 36 may be isolated on one side of the equations leaving the following identity:

$$R_1 w / r_1 = R_2 w / r_2 \; ; \; r_1 / r_2 = R_1 / R_2 \quad (9)$$

Thus, to achieve the desired correspondence between linear velocities of the roller surface and the cutting blade planar surface at all points of contact therebetween, the ratio of $R_1/R_2$ must be equal to the ratio of $r_1/r_2$. This equality may be satisfied by providing a frustoconical roller 36 positioned such that its axis of rotation 42 intersects the axis of rotation 20 of the cutting blade 16 at the planar surface 22 of the cutting blade 16 as is illustrated in FIG. 3. With the frustoconical roller 36 thus positioned, the linear velocities at all points of contact between the peripheral surface of the roller and the planar surface 22 of the cutting blade are equal and slippage therebetween does not necessarily occur as with the FIG. 1 arrangement.

To properly locate the desired position of the roller 36 the one criterion, i.e., that the axis of rotation 42 of the roller properly intersect the axis of rotation 20 of the cutting blade at the blade surface 22, may be satisfied by calculating the position of the radially innermost end of the roller 36 which makes contact at the point 46 with the planar surface 22, using the following equation:

$$R_1 = \left(\frac{r_1 L}{r_2}\right)\left(\frac{1}{1-\left(\frac{r_1}{r_2}\right)}\right) \quad (10)$$

where
L is the length of the contact surface of the roller 36, i.e., the quantity $R_2 - R_1$.

The adjustment means 44 of FIG. 3 is illustrated in greater detail in FIG. 4.

Referring now to FIGS. 3 and 4, the support frame 38 may be provided with two generally parallel shafts 50 and 52 disposed generally perpendicular to the planar surface 22 of the cutting blade 16. The shafts 50 and 52 are slidably received in holes extending through a support member 54 which may be fixed as to the cutting machine in any suitable manner. A pair of adjustment screws 56 and 58 extend through the support member 54 at a location generally centrally disposed relative to the holes through which the shafts 50 and 52 extend. The adjustment screw 56 is threaded both externally and internally with the external threads engaging threads in the support member 54 so that the threaded shaft 56 may be adjusted transversely with respect to the support member 54 by rotating the shaft 56. A handle 60 at one end of the shaft 56 may be provided for this purpose.

The shaft 58 is externally threaded and is received within the shaft 56 in threaded engagement with the internal threads thereof. One end 62 of the shaft 58 engages the support frame 38 while the other end 64 thereof may be provided with a hexagonal head to permit the shaft 58 to be rotated through the use of a wrench or other means. Suitable lock nuts 66 and 68 may be provided to lock the shafts 56 and 58 respectively when the roller pressure has been properly adjusted.

Both of the shafts are provided, for example, with right-hand threads but the number of threads per inch may be slightly different. For example, the shaft 56 may be provided with 20 threads per inch. Thus, if the shaft 56 is rotated clockwise one turn while the shaft 58 is held firmly against rotation, the resulting displacement of the end 62 of the shaft 58, and thus the displacement of the support frame 38, toward the planar surface 22 of the cutting blade 16 is approximately 1/20 inch − 1/21 inch or approximately 0.0026 inch, since as the shaft 56 moves toward the blade 16 the shaft 58 moves, by a lesser amount away from the blade. It can thus be appreciated that extremely fine adjustments in the pressure of the roller 36 against the planar surface 22 of the cutting blade 16 may be provided in this manner.

The roller means 36 of FIG. 3 need not, of course, present a continuous surface in contact with the planar surface 22 of the cutting blade 16. As illustrated in FIG. 5, the roller may comprise a segmented frustoconical roller, i.e., a plurality of spaced, frustoconical disks 70 which together define a generally frustoconical damping means. The disks 70 may be independently mounted for rotation on a shaft 72 as was previously described in connection with FIG. 2 or may be fixedly mounted on a shaft 72 with the shaft 72 journaled for rotation in a support member 74.

The frustoconical damping member defined by the disk 70 may be positioned relative to the cutting blade 16 in the same manner as the roller 36 of FIG. 3, i.e., with the axis of rotation 76 thereof intersecting the axis of rotation 20 and the planar surface 22 of the cutting blade 16. This arrangement provides all of the advantages of the embodiment of FIG. 3 with respect to the substantial equality of the linear velocities of all points of contact with the planar surface of the cutting blade. Moreover, any heat which is generated by the frictional contact between the disks and the cutting blade is more easily dissipated by the spaced disks because of the increased surface area presented by the planar tops and bottoms of each of the disks to the surrounding atmosphere.

As an alternative to the manner of adjusting the roller means relative to the cutting blade previously described in connection with FIG. 3, the support member 74 may be mounted to the frame of the cutting machine in any suitable conventional manner so that the damping means defined by the disks 70 may be adjusted along its axis of rotation 76. An adjustment means similar to the adjustment means 44 of FIGS. 3 and 4, positioned to provide this axial adjustment of the damping means, may be utilized for this purpose. Thus, as the discs 70 become worn and their radii decrease, adjustment of the damping means to provide the desired pressure on the planar surface 22 of the cutting blade 16 automatically provides adjustment of the damping means relative to the axis of rotation 20 of the cutting blade by moving the roller means along the axis 76 intersecting the axis 20 at the blade surface 22. Thus the relationship of equation (10) is retained.

SUMMARY OF ADVANTAGES AND SCOPE OF THE INVENTION

It is apparent from the foregoing description that the present invention provides a novel method and damping means for damping vibration of a rotary cutting blade which is simple yet effective in damping extreme vibrations.

The invention permits the damping of cutting blade vibration without excessive heat buildup and wear of either the planar surface of the cutting blade or the damping means itself. Moreover, the damping means is accurately adjustable to permit highly accurate adjustment of the pressure on the cutting blade planar surface.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description and all deletions, modifications, substitutions or other changes which come within the meaning and range of equivalency of the claims are therefore intended to be embraced therein.

What is claimed is:

1. In combination:
   a rotary cutting blade having a generally planar surface and having cutting teeth along a peripheral edge thereof, the cutting blade having an axis of rotation generally transverse to said planar surface;
   support means;
   vibration damping means rotatably carried by said support means for applying damping pressure to said blade, said vibration damping roller means defining a substantially frustoconical peripheral surface in frictional contact with said planar surface, said peripheral surface defined by said vibration damping roller means being pressure engageable with and operable to be driven by said planar surface of said cutting blade such that the linear velocity of any point along the peripheral surface is substantially equal to the linear velocity of any corresponding contact point on the planar surface of the cutting blade;
   the axis of rotation of said roller means being oriented in a direction so as to substantially intersect the planar surface of said cutting blade at the axis of rotation of said cutting blade; and
   adjusting means for adjusting the damping pressure applied by said vibration damping roller means to said blade through adjusting said roller means along the axis of rotation thereof, thereby to adjust the position of said peripheral surface of said roller means both transversely of and parallel to the surface of said cutting blade.

2. The combination according to claim 1 wherein said roller means includes a plurality of spaced roller sections each having a substantially frustoconical peripheral surface, the roller sections together defining said substantially frustoconical peripheral surface of said roller means.

3. In combination:
   a rotary cutting blade having a generally planar surface and having cutting teeth along a peripheral edge thereof, the cutting blade having an axis of rotation generally transverse to said planar surface;
   support means;
   vibration damping roller means rotatably carried by said support means for applying damping pressure to said blade,
   said roller means being defined by a plurality of axially spaced disks each presenting a narrow peripheral surface in contact with and operable to be driven by the planar surface of said cutting blade, each of said disks being mounted for independent rotation about its axis of rotation, the axis of rotation of each of said disks being generally parallel to the planar surface of said cutting blade and intersecting the axis of rotation of said cutting blade, the axial length of said roller means defined by said disks being substantially greater than the axial length of each narrow peripheral surface presented by each disk; and means for adjusting the damping pressure applied by said vibration damping roller means to said blade.

4. In combination:

a rotary cutting blade having a generally planar surface and having cutting teeth along a peripheral edge thereof, the cutting blade having an axis of rotation generally transverse to said planar surface;

support means;

roller means rotatably carried by said support means and defining a substantially frustoconical peripheral surface in frictional contact with said planar surface, said peripheral surface defined by said roller means being operable to be driven by said planar surface of said cutting blade such that the linear velocity of any point along the peripheral surface is substantially equal to the linear velocity of any corresponding contact point on the planar surface of the cutting blade;

the axis of rotation of said roller means being oriented in a direction so as to substantially intersect the planar surface of said cutting blade at the axis of rotation of said cutting blade; and said roller means including a plurality of spaced roller sections each having a substantially frustoconical peripheral surface, the roller sections together defining said substantially frustoconical peripheral surface of said roller means.

5. In combination:

a rotary cutting blade having a generally planar surface and having cutting teeth along a peripheral edge thereof, the cutting blade having an axis of rotation generally transverse to said planar surface;

support means;

roller means rotatably carried by said support means, said roller means defining a substantially frustoconical peripheral surface in contact with the planar surface of said cutting blade, the axis of rotation of said roller means being oriented in a direction so as to substantially intersect the planar surface of said cutting blade at the axis of rotation of said cutting blade, so that the peripheral surface defined by said roller means is operable to be driven by the planar surface of said rotary cutting blade with substantially no slippage therebetween; and said roller means including a plurality of spaced roller sections each having a substantially frustoconical peripheral surface, the roller sections together defining said substantially frustoconical peripheral surface of said roller means.

6. The combination according to claim 5 including adjustment means operable to adjust the position of said peripheral surface of said roller means relative to the planar surface of said cutting blade in at least a transverse direction.

7. The combination according to claim 6 wherein said adjustment means is operable to adjust said roller means along the axis of rotation thereof thereby to adjust the position of the roller means both transversely of and parallel to the surface of said cutting blade.

* * * * *